United States Patent [19]  
Cederholm

[11] 4,146,342  
[45] Mar. 27, 1979

[54] FASTENER SYSTEM

[76] Inventor: Gunnar Cederholm, 565 Nyes Pl., Laguna Beach, Calif. 92651

[21] Appl. No.: 820,736

[22] Filed: Aug. 1, 1977

Related U.S. Application Data

[63] Continuation-in-part of Ser. No. 757,210, Jan. 6, 1977, abandoned.

[51] Int. Cl.² .............................................. F16B 21/02
[52] U.S. Cl. .................................... 403/247; 403/353; 52/285
[58] Field of Search ............... 403/247, 173, 230, 254, 403/255, 353, 201, 187, 237; 108/108; 52/285; 312/111, 108, 263

[56] References Cited

U.S. PATENT DOCUMENTS

| 2,258,909 | 10/1949 | Reens | 312/111 X |
| 3,159,440 | 12/1964 | Courtwright | 312/263 |
| 3,229,334 | 1/1966 | Thome | 403/173 |
| 3,329,473 | 7/1967 | Dickson | 312/108 |
| 3,580,535 | 5/1971 | Naske | 248/239 |

FOREIGN PATENT DOCUMENTS 425010 3/1935 United Kingdom ................... 403/230

Primary Examiner—Andrew V. Kundrat  
Attorney, Agent, or Firm—Christie, Parker & Hale

[57] ABSTRACT

A fastener system enabling assembly of kit components by an unskilled purchaser without use of tools. A wedge-lock ring is seated in a pre-formed socket in one kit member such as a horizontal shelf. A pin is seated in an opening in another kit member such as a vertical end panel. The pin is then engaged with the ring, and the kit members are drawn together tightly and securely in an assembled position. Disassembly is accomplished simply by tapping the kit members to disengage the pin from the ring. A cam locking member and retractable pin are also disclosed for use with the system. The fastener system is useful in assembling bookshelves, cabinets, tables, chairs, desks and other articles which are marketed in kit form.

16 Claims, 14 Drawing Figures

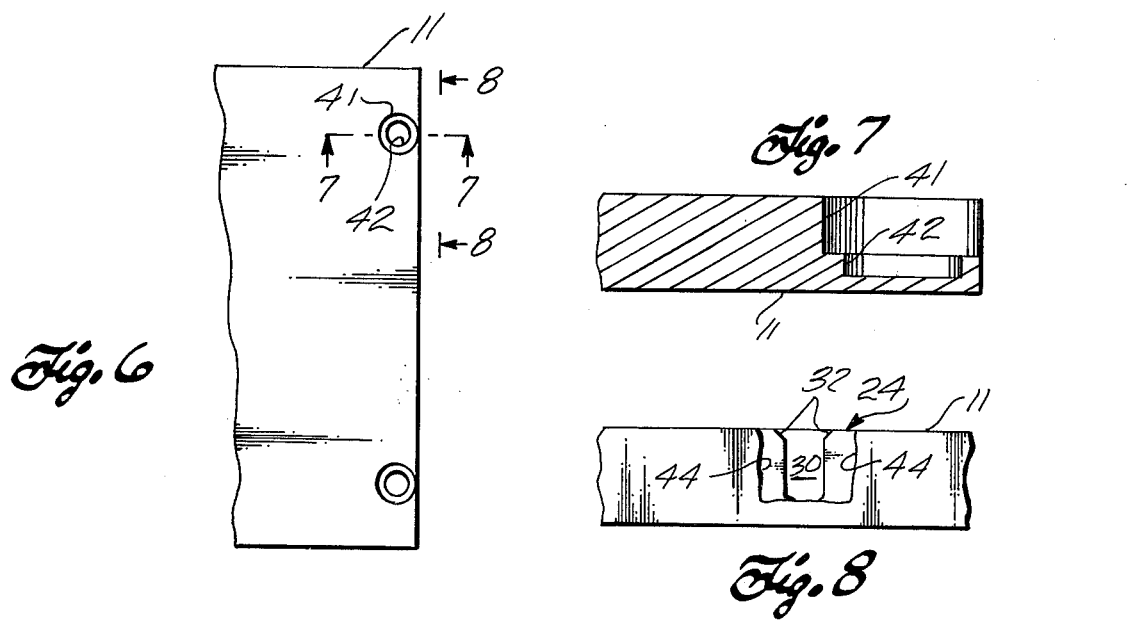
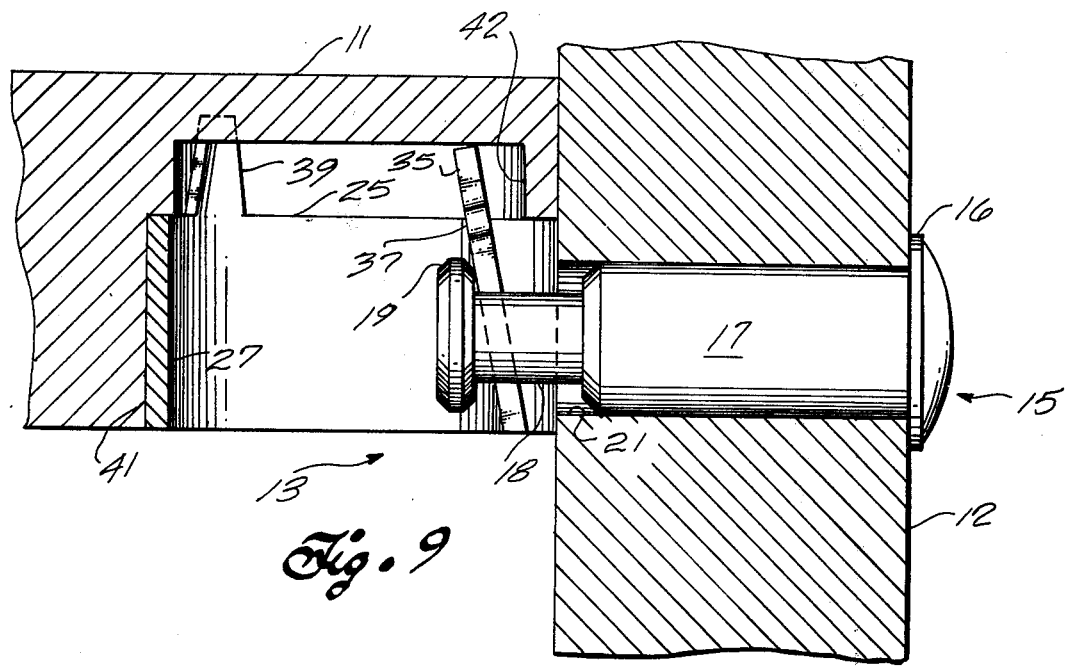

FASTENER SYSTEM

CROSS REFERENCE TO RELATED APPLICATION

This is a continuation in part of U.S. patent application Ser. No. 757,210 filed Jan. 6, 1977 and now abandoned.

BACKGROUND OF THE INVENTION

A variety of products are sold in kit form for final assembly by the purchaser. Such products include furniture, toys, household and garden fixtures, and the like. Significant economies arise from marketing of such products in kit form due to lower shipping expense for a compact package of "knocked down" parts, and also through elimination of final-assembly labor during manufacture.

Some form of fastener is needed to secure the kit members together, and common wood screws are often supplied with the kit. Assembly is straightforward for anyone having proper tools and reasonable skill in the use of tools, but many purchasers do not have these attributes. Improper use of a screwdriver, for example, can cause distorted, unattractive screwheads in the assembled kit, and may also result in split or broken kit components.

Manufacturers of kit products have found there is a marketing advantage in advertising "no tools required" assembly procedures for the kit parts. The fasteners previously used in such kits, however, have not been uniformly satisfactory from the standpoint of providing a tight and secure attachment of parts, and of insuring a proper mating fit of adjacent parts which have dimensional inaccuracies. Known fasteners also tend to be expensive and relatively complex, thereby defeating the objectives of kit simplicity and economy.

One style of known fastener consists of a socket assembly which typically is made of two or three separate parts including a rotatable locking cam. A pin mates with the socket, and a screwdriver or wrench is used to rotate the cam into tight mating engagement with the pin. These fasteners perform well, but are expensive to make, and their use adds significantly to the factory cost of a furniture kit which may require dozens of individual fasteners. The kit assembler is also required to use some kind of tool to insure proper attachment of the kit components.

Other known styles of fasteners include a "no tools" arrangement when a pin mates with a wedging surface on an elongated and slotted socket member. This arrangement, however, requires the cutting of a non-circular racetrack-shaped recess in the kit part which receives the socket member, and this step adds significantly to the cost of making the kit parts. Fasteners of this type also may produce misalignment of the kit parts if a tight attachment is to be achieved.

The fastener system of this invention overcomes these problems by being economical to manufacture and install, and simple to attach and lock without use of tools by the retail purchaser. Dimensional variations of kit parts within reasonable tolerances are acommodated by the fastener system, and disassembly is also accomplished without tools if the product is to be knocked down and reassembled in a new location by the purchaser.

SUMMARY OF THE INVENTION

Briefly stated, this invention relates to a fastener assembly which uses a pin in conjunction with a wedge-lock ring to secure together kit components such as horizontal shelves and vertical end panels of a bookshelf kit. Holes are formed in the vertical end panels to receive the pins, and blind circular recesses are cut at the ends of the under-surface of the shelves to receive the wedge-lock rings.

The wedge-lock ring is a unitary and generally annular band with upper and lower edges connected by a side wall having first and second ends which are separated to define a pin-receiving slot. The band is generally in the form of a right-circular hollow cylinder, with the exception that a portion of the side wall adjacent the pin-receiving slot slopes inwardly from the lower edge to the upper edge to form a wedging surface on the inside of the ring on opposite sides of the slot. Preferably, the slot has a lower portion of substantially constant width, and an upper portion of decreased width to prevent passage of the pin completely through the slot at the upper end of the ring. In one form, the band includes a pair of upwardly extending tabs on opposite sides of an upper portion of the slot, the tabs having facing surfaces which converge toward each other to define the narrowed slot portion.

Preferably, the band includes one or more locking teeth extending upwardly from the upper edge of the band generally opposite the slot. The inwardly sloping surface of the side wall preferably slopes at an angle of about 11° to the axis of the right-circular cylindrical portion of the band. A pin used in conjunction with the wedge-lock ring has a shank terminating in an enlarged locking head configured to bear against the wedging surface of the ring. The pin shank has a reduced-diameter portion adjacent the locking head, the reduced-diameter portion being dimensioned to pass freely through the lower portion of the ring slot, but being too large in diameter to slip through the upper slot portion.

An alternative embodiment of the fastener system includes a pin which is movably and retractably mounted in a serrated sleeve. The sleeve is configured to be driven into an undersized blind bore in the vertical end panel, and the pin is recessed below the panel surface until the kit components are ready for assembly. A further feature of the invention relates to a locking cam which is rotatably fitted in a blind bore in the end panel. The cam is rotated after the several panels are assembled to lock the components together.

BRIEF DESCRIPTION OF THE DRAWINGS

FIG. 6 is a bottom view of a bookshelf which has been bored with recesses to receive the ring;

FIG. 7 is a sectional elevation on line 7—7 of FIG. 6;

FIG. 8 is an end view of the bookshelf with the ring installed as taken on line 8—8 of FIG. 6;

FIG. 9 is a sectional elevation of the assembled bookshelf-kit members secured together with the fastener system;

FIG. 10 is an elevation of a vertical end panel of a bookshelf;

FIG. 11 is an enlarged section on line 11—11 of FIG. 10 showing a locking cam and an alternative retractable pin;

FIG. 12 is an end view of the locking cam on line 12—12 of FIG. 11;

FIG. 13 is an end view of the retractable pin on line 13—13 of FIG. 11; and

FIG. 14 is a sectional elevation of a bookshelf and end panel secured together with the ring, retractable pin, and locking cam.

DESCRIPTION OF THE PREFERRED EMBODIMENT

Figure 1:
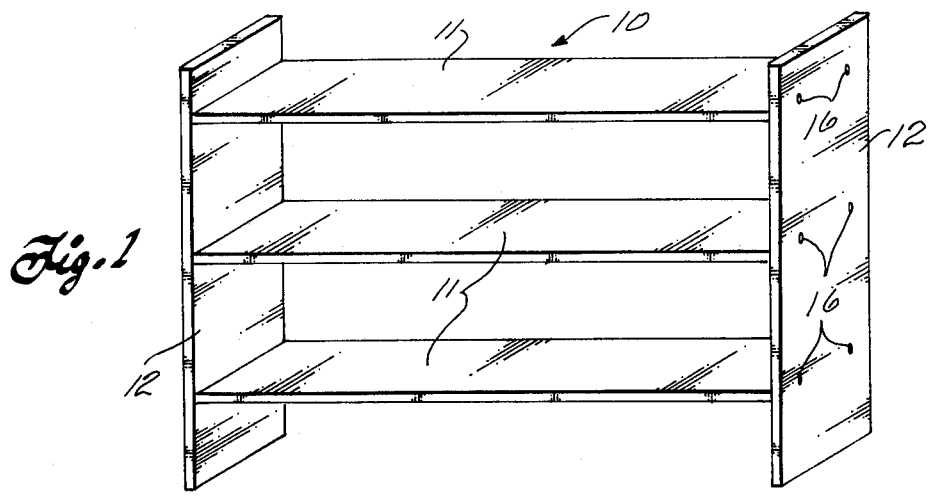
FIG. 1 is a pictorial view of an assembled bookshelf kit, the components of which are secured together with fasteners according to the invention.
Figure 2:
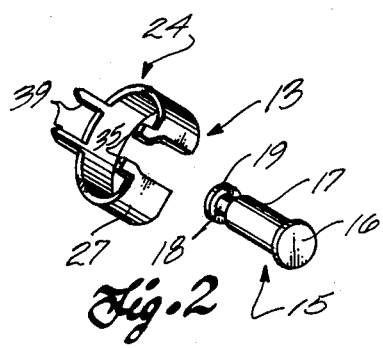
FIG. 2 is a pictorial view of a wedge-lock ring and pin which form a fastener system according to the invention.

FIG. 1 shows a bookshelf 10 which is a typical item assembled from kit form using a fastener system of this invention as described in greater detail below. The bookshelf consists of several horizontal shelves 11 extending between and secured to a pair of vertical end panels 12. These members are secured together by a plurality of fastener systems 13 as generally shown in FIGS. 2 and 9.

The first element of the fastener system is a generally cylindrical pin 15 having a shallow flanged head 16 at one end. A shank 17 of the pin extends away from head 16 to a cylindrical reduced-diameter portion 18 adjacent the opposite end of the pin. This end of the pin terminates in an enlarged locking head 19 having slightly beveled sides as best seen in FIG. 9.

The panels used in furniture kits such as shown in FIG. 1 are typically pressed wood with a plastic film laminated to the outer surfaces to simulate a wood-grain finish. Panels of ⅝-inch thickness are typically used in kits of this type. Holes 21 (FIG. 9) are drilled through end panels 12 to receive pins 15, with pin shanks 17 making a slip fit in the holes as shown in FIG. 9. The length of shank 17 is selected to be slightly less than the thickness of the panel, such that reduced-diameter portion 18 extends from the panel when the pin is fully inserted.

In a typical configuration, a pin for use with a ⅝-inch panel has an overall length of 0.900 inch, and flanged head 16 has a diameter of about 0.375 inch. The length of shank 17 is about 0.575 inch, and the length of reduced-diameter portion 18 is about 0.195 inch. The diameter of the shank and locking head is about 0.275 inch, and the diameter of the reduced-diameter portion is about 0.170 inch. The pin can be machined from cold-rolled steel but is preferably a zinc casting with a black-oxide surface to blend attractively with the walnut finish typically used on components of kit furniture.

The second element of fastener system 13 is a wedge-lock ring 24 (FIGS. 2–5) which is preferably formed in a progressive die from a band of cold-rolled steel of about 0.048-inch (18 gage) thickness. The band is curved into a generally annular shape, and has upper and lower edges 25 and 26 connected by a sidewall 27. The sidewall has first and second ends 28 and 29 which are separated to define a pin-receiving slot 30 in the ring.

Lower edges 32 of the band ends are beveled to guide the pin into the slot during assembly of the kit parts. The central part of the slot is of constant width, but the band ends converge toward each other at their upper ends to form a reduced-width slot portion 33 adjacent the top of the band. Preferably, a pair of tabs 35 extend upwardly on opposite sides of the slot to strengthen and stabilize the band ends when the ring is installed.

Figure 3:
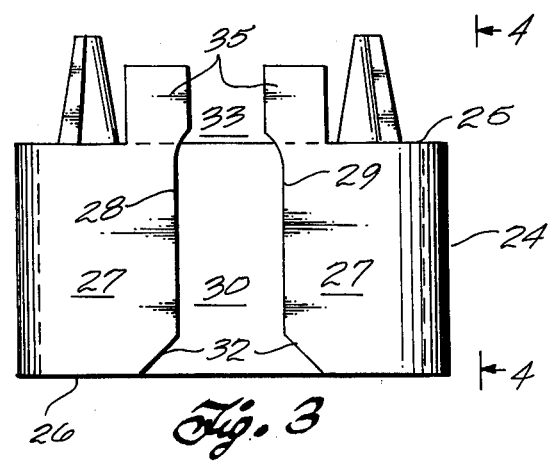
FIG. 3 is a front elevation of the ring.
Figure 4:
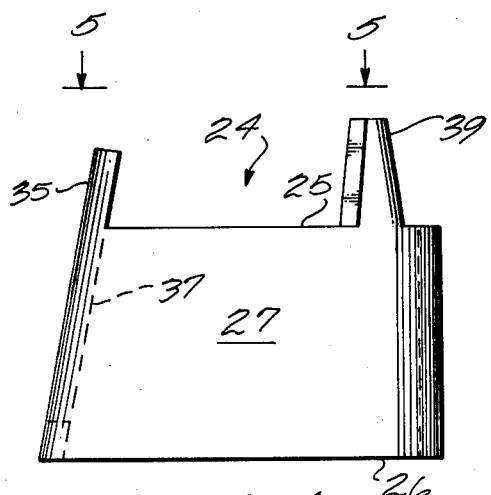
FIG. 4 is a side view of the ring on line 4—4 of FIG. 3.
Figure 5:
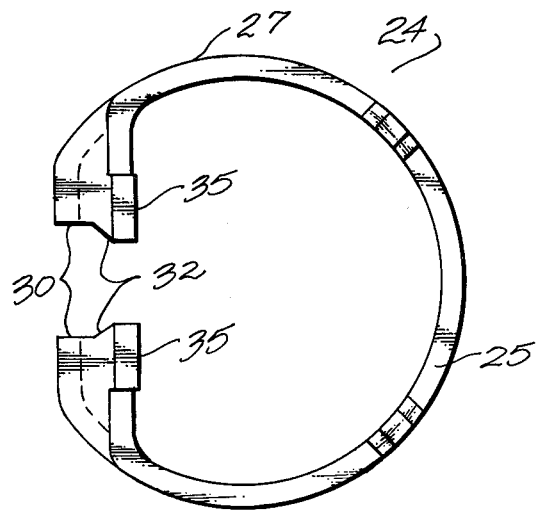
FIG. 5 is a top view of the ring on line 5—5 of FIG. 4.

As best seen in FIGS. 3–5, the band is generally in the form of a right-circular hollow cylinder except for a portion adjacent slot 30 where the sidewall slopes inwardly from lower edge 26 toward upper edge 25 to form a wedging surface 37 on the inside of the ring. The lower edge of the band is preferably flat, and the upper edge is also flat with the exception of upwardly extending tabs 35 and a pair of tapered locking teeth 39 extending upwardly from the top of the band generally opposite slot 30.

In a typical configuration suitable for use with pin 15 described above, the cylindrical portion of ring 24 has an outside diameter of about 0.675 inch, and the height of the main body of the band is about 0.375 inch. Locking teeth 39 preferably extend about 0.175 inch above the band to give an overall ring height of about 0.550 inch. Wedging surface 37 preferably slopes at an angle of about 11 degrees to the cylindrical axis of the ring. Slot 30 is about 0.180 inch in width, narrowing to about 0.125 inch in reduced-width slot portion 33.

FIG. 6 shows the undersurface of a shelf 11 which has been prepared to receive a pair of wedge-lock rings 24. A pair of stepped-diameter blind bores are formed in the undersurface of the panel immediately adjacent the panel end. As best seen in FIG. 7, the stepped-diameter bore has a large-diameter portion 42 (of about 0.718-inch diameter) and a reduced-diameter portion 42 (of about 0.625-inch diameter). When panels of ⅝-inch thickness are used, the large-diameter portion has a depth of about 0.375 inch, and the small-diameter portion has a depth of about 0.125 inch, thereby insuring that the bore does not extend completely through the panel to mar the upper surface of the shelf.

The center of the stepped-diameter bore is positioned at a spacing from the panel end equal to the radius of the large-diameter bore portion. This insures that the large-diameter portion of the bore will break through the pressed-wood panel end to define an opening 44 as shown in FIG. 8. The bore is quickly and easily formed in a single machine operation using a stepped-diameter cutter.

Rings 24 are preferably factory installed in shelves 11 as shown in FIGS. 8 and 9. The ring is pressed into the bore until upper edge 25 abuts the step or annular shoulder formed by reduced-diameter bore portion 42. In this position, teeth 39 penetrate the panel to lock the ring into position. The ring is oriented during insertion to position pin-receiving slot 30 in alignment with opening 44 in the panel end as shown in FIG. 8.

When bookshelf 10 is assembled by the purchaser, pins 15 are inserted through holes 21 in the bookshelf end panels as shown in FIG. 9. Shelf 11 is then positioned above the pins with slots 30 of wedge-lock rings 24 in alignment with the projecting inner ends of the pins. The shelf is then tapped downwardly to position reduced-diameter portion 18 of the pin within slot 30 of the ring. As downward motion of the shelf continues, locking head 19 comes into engagement with wedging surface 37 to draw the bookshelf panels tightly together. Assembly of the panels is completed in this one simple step without use of any tools, and disassembly is accomplished equally easily by tapping the shelves upwardly to disengage the pins and rings.

The use of an approximately 11° slope on wedging surface 37 accommodates slight dimensional variations in the length and thickness of the panels, while insuring a secure locking action. The purpose of reduced-width slot portion 33 at the top of the pin-receiving slot is to insure that the pin cannot be driven completely through the slot to break through the upper surface of the shelf. The ring is stably positioned in the shelf bore, and is able to withstand an overly vigorous joining of the panels without becoming dislodged.

An important feature of the fastener system is that the lower edges of the rings are flush with or slightly below the shelf surface, and the pins may be packaged separately for shipment prior to assembly. This means that the shelves and end panels can be shipped in a flat stack without corrugated-paper separators sometimes needed with other fastener systems to avoid marring of adjacent panel surfaces during packaging and shipping.

The pins and rings are significantly less expensive to manufacture than other known fastener systems, and the circular shape of the ring-receiving bores also contributes to reduced manufacturing cost. If desired, pin 15 may be provided with a threaded shank for installation in a blind hole in end panel 12, but the through-bore installation shown in the drawings is preferred to avoid the use of tools during assembly by the final purchaser.

FIGS. 10–14 show an alternative embodiment of the fastener system with features which may be preferred in some uses of the system. One feature relates to a locking cam which assures that the assembled panels will remain securely attached even when the bookcase (or similar assembly) is lifted and relocated. The other feature is a retractable pin which can be factory installed without loss of freedom to ship the "knocked down" kit panels in a face-to-face stack.

When the locking feature is desired, an end panel 12A (FIGS. 10 and 11) is prepared with a blind bore or locking-cam socket 50 which is positioned between and slightly above sockets 51 for the pins of the fastener system. When typical panels of $\frac{5}{8}$-inch thickness are used, the horizontal centerline of socket 50 is about 0.700 inch above the horizontal centerline of sockets 51. The locking-cam socket typically has a diameter and depth of about 0.500 inch.

A locking cam 52 (FIGS. 11 and 12) has a hollow cylindrical shank 53 with an outer diameter dimensional to be a slip fit in socket 50. A round head 54 is integrally formed at one end of the shank, and the radial center of the head is offset with respect to the radial center of the shank so the outer cylindrical surfaces of these portions are eccentric to each other. A slot 55 is formed in head 54, and is preferably curved so the locking cam can be rotated with a coin inserted in the slot.

The locking cam can be economically molded from styrene or a similar plastic material, and is preferably dark brown in color to blend with the walnut-finish panels often used in furniture kits. The cam typically has an overall axial length of about 0.525 inch, and head 54 is about 0.085 inch thick. The head has a diameter of about 0.680 inch, and the radial centers of the shank and head are offset about 0.060 inch.

The locking cam is not installed in socket 50 until shelf 11 and panel 12A have been assembled with a fastener system such as shown in FIGS. 9 or 14. When the panels are thus clamped together, the cam is inserted in the socket with the "thin" side of head 54 facing the top of shelf 11 as suggested in FIG. 11. The cam is then rotated to draw the "thick" side of the head tightly against the upper surface of the shelf as shown in FIG. 14. This frictional locking arrangement assures that the clamped panels will remain secured together when the bookshelf or similar furniture assembly is lifted and bodily moved, and yet disassembly is easily accomplished when desired simply by rotating and removing the locking cam prior to tapping the panels apart.

In certain types of furniture kits, it may be preferable to have vertical end panels with a plain outer surface which is unbroken by heads 16 of pins 15 used in the first embodiment described above. An alternative pin assembly 60 which meets this objective is shown in FIGS. 11 and 14, and is completely compatible with wedge-lock ring 24 already described.

Assembly 60 includes a generally cylindrical mounting sleeve 61 which is forcibly driven into the blind bore forming locking-pin socket 51 in end panel 12A. The sleeve is hollow, and has an inner cylindrical surface 62 which is inwardly stepped adjacent the outer sleeve end to define a retaining shoulder 63. The outer surface of the sleeve has a plurality of circumferential tapered grooves forming teeth 64 which lock the sleeve in socket 51 as shown in FIGS. 11 and 14.

The sleeve can be a molded plastic or machined steel part, but is preferably a zinc casting. In a typical form, the sleeve has an overall length of about 0.450 inch, and an outer-end diameter of about 0.500 inch. To ease insertion of the sleeve, the outer diameter is tapered approximately two degrees to reduce to about 0.475 inch at the innder end. The inside diameter of the sleeve is about 0.350 inch, reducing to 0.285 inch outwardly of shoulder 63.

Assembly 60 further includes a modified pin 68 having a locking head 69 and reduced-diameter portion 70 identical to the corresponding parts already described with reference to pin 15. A shank 71 of pin 68 is shorter than the shank of pin 15, and is outwardly stepped in diameter to define a shoulder 72 and an enlarged retaining head 73. As with pin 15, the modified pin can be machined from steel stock, but is preferably a zinc casting.

Pin 68 typically has an overall length of about 0.550 inch, the retaining head being about 0.190 inch in length and about 0.342 inch in diameter to make a slip fit within sleeve 61. Head 69 and shank 71 are about 0.275 inch in diameter to fit freely through the opening in the outer end of the sleeve.

When assembly 60 is used, end panel 12A is prepared by forming sockets 51 as blind bores with a depth of about 0.585 inch (assuming a pressed-wood panel of 0.625-inch thickness) and diameter of about 0.437 inch. Sleeves 61 are then driven to the bottom of the undersized sockets to be securely retained by teeth 64 which engage the slightly resilient pressed-wood panel. A pin 68 is fitted into each sleeve prior to driving the sleeve into the panel.

Assembly 60 is preferably factory installed in the end panel, and is shown in a retracted position in FIG. 11. The parts are dimensioned to insure that locking head 69 of the pin is recessed beneath the surface of panel 12A when the pin is retracted. This feature permits the various panels of a furniture kit to be compactly packaged and shipped in face-to-face abutment without fear of marring the panel surfaces.

When the furniture kit is assembled, pins 68 are extended into the position shown in FIG. 14 by grasping the locking heads or simply shaking the panels slightly. Assembly then proceeds exactly as already described with reference to the assembled components shown in FIG. 9. Each pin 68 is captively retained and properly positioned within its associated sleeve by abutting shoulders 63 and 72 as shown in FIG. 14.

Although the fastener system has been described in the context of a bookshelf kit, it is to be understood that this is merely a typical application selected for purposes of illustration. The system is equally useful in a variety of other furniture kits (desks, cabinets, etc.) and also in the assembly of non-furniture products which are sold in kit form for assembly by the purchaser.

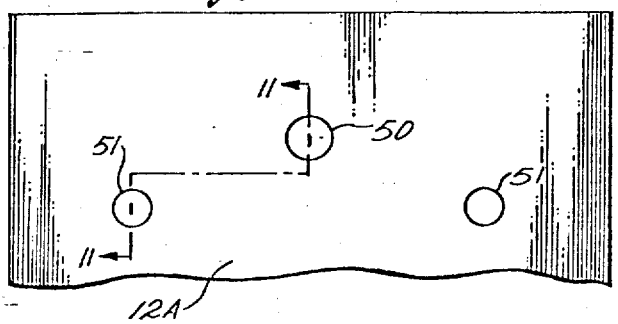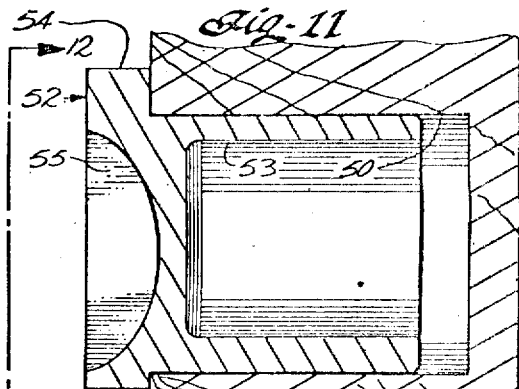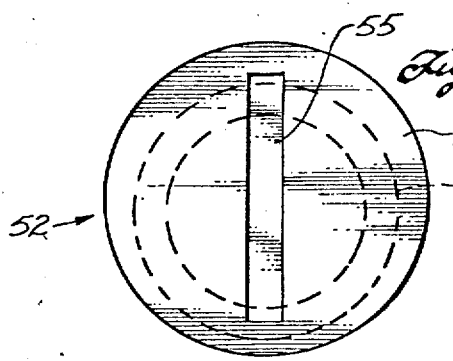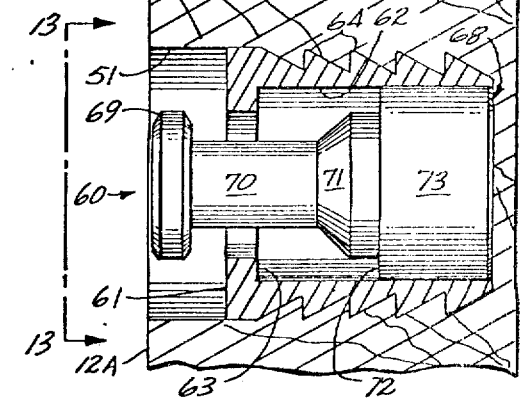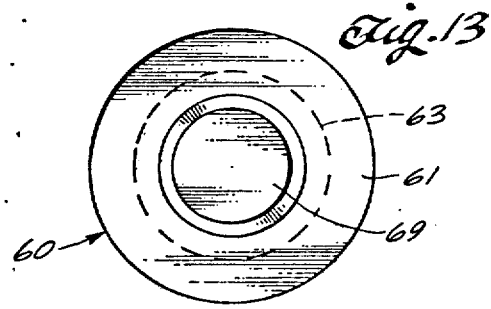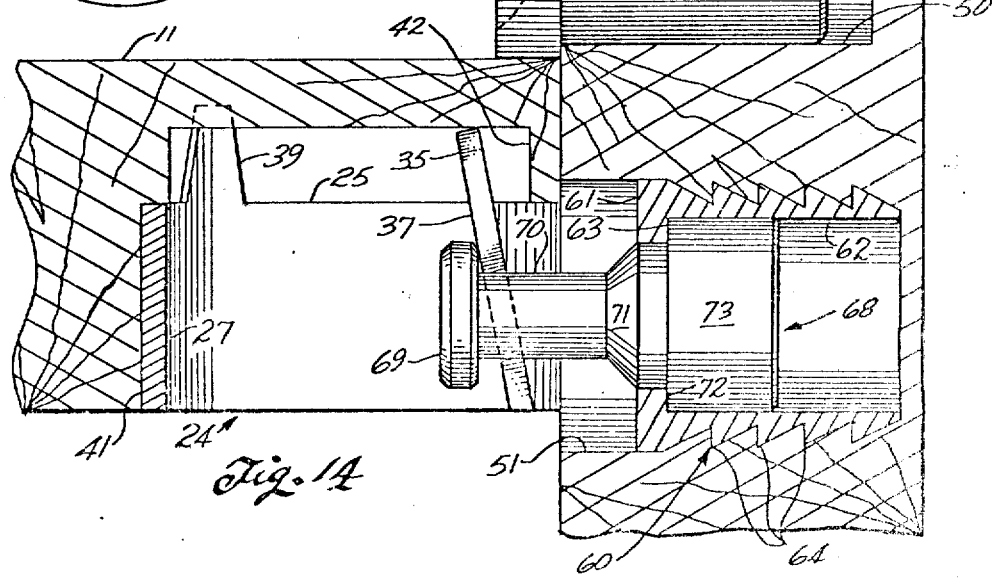

What is claimed is:

1. A wedge-lock ring for use with a pin in a fastener system for connecting components of furniture kits and the like, the ring comprising a unitary and generally annular metal band with upper and lower edges connected by a sidewall having first and second ends which are separated to define a pin-receiving slot, the band being generally in the form of a right-circular hollow cylinder except adjacent the slot where the sidewall slopes inwardly from the lower edge to the upper edge to form a wedging surface on the inside of the ring on opposite sides of the slot, the band further having a pair of upwardly extending tabs on opposite sides of an upper portion of the slot, the tabs having separated facing surfaces which converge toward each other to narrow the width of the upper slot portion.

2. The ring defined in claim 1, and further comprising a locking tooth integrally formed with and extending upwardly from the upper edge of the band.

3. The ring defined in claim 1 wherein the inwardly sloping surface of the sidewall slopes at about 11 degrees to the axis of the right-circular cylindrical portion.

4. The ring defined in claim 3 wherein the band includes a pair of spaced-apart locking teeth extending upwardly from the upper edge generally opposite the slot.

5. The ring defined in claim 4, and further comprising an elongated pin having a shank with an enlarged locking head at one end, and a reduced-diameter portion adjacent the locking head, the reduced-diameter portion being sized to fit through the lower portion of the slot but being too large in diameter to slip through the upper slot portion, the locking head being radially larger than the slot width.

6. The combination defined in claim 5, and further comprising a hollow pin-mounting sleeve configured to be pressed into a blind bore in a furniture-kit component, the pin being slidably mounted and captively retained in the sleeve when the sleeve is installed in the bore.

7. A furniture kit assembly, comprising:
first and second panels which are to be joined in perpendicular relationship, the first panel having a pin-receiving opening, and the second panel having a stepped-diameter blind cylindrical bore in an undersurface portion at the panel end, the bore defining a generally annular shoulder;
a pin positioned in the opening in the first panel, the pin having a shank portion in the panel opening, a reduced-diameter portion extending from the shank portion to project from the panel, and an enlarged locking head at the end of the reduced-diameter portion; and
a wedge-lock ring seated in the bore of the second panel against the annular shoulder, the ring having a slot extending generally parallel to the thickness dimension of the second panel and opening into the panel end to receive the reduced-diameter portion of the pin, the ring having a sidewall with an inwardly sloping portion adjacent the slot to make a wedging fit against the locking head of the pin to draw together and fasten the panels, the sloping sidewall portion extending beyond the annular shoulder toward a base of the stepped-diameter blind bore.

8. The assembly defined in claim 7, wherein the pin-receiving opening in the first panel is a blind bore, and further comprising a generally cylindrical hollow sleeve secured in the blind bore, and having an outer end defining an inwardly extending shoulder; the pin having an enlarged retaining head at an end opposite the locking head, the retaining head being positioned within the sleeve and captively retained by the sleeve shoulder, the pin being movable with respect to the sleeve and panel between a retracted position where the locking head is recessed below the surface of the first panel before the panels are assembled, and an extended position wherein the locking head extends from the first panel to engage the wedge-lock ring.

9. The assembly defined in claim 8 wherein the sleeve makes an interference fit in the pin-receiving opening, the outer surface of the sleeve defining teeth to engage the first panel.

10. The assembly defined in claim 8 wherein the wedge-lock ring is a unitary and generally annular band with upper and lower edges connected by a sidewall having first and second ends which are separated to define the slot, the upper edge of the band being adapted to seat against the annular shoulder of the stepped-diameter bore.

11. The assembly defined in claim 10 wherein the sloping sidewall portion of the band includes a pair of upwardly extending tabs on opposite sides of an upper portion of the slot, the tabs having facing surfaces which converge to narrow the width of the upper slot portion to block passage of the reduced-diameter portion of the pin.

12. The assembly defined in claim 11, and further comprising a locking tooth integrally formed with and extending upwardly from the upper edge of the band to penetrate the annular shoulder of the stepped-diameter bore and thereby to lock the ring in the second panel.

13. The assembly defined in claim 12, and further comprising a locking member engaged with one of the panels and movable into contact with the other panel to urge the locking head of the pin against the sloping surface of the ring sidewall.

14. The assembly defined in claim 7, and further comprising a locking member engaged with the first panel and movable into contact with the second panel to resist separation of the pin and ring.

15. The assembly defined in claim 14, wherein the first panel has a locking-member opening positioned adjacent the upper surface of the second panel when the panels are secured together by the pin and ring; and wherein the locking member has a shank rotatably fitted into the locking-member opening, and a head at the outer end of the shank, the head being eccentric with respect to the shank whereby rotation of the locking member rotates the head against the upper surface of the second panel with a camming action.

16. A furniture kit assembly, comprising:
first and second panels which are to be joined in a generally perpendicular relationship, the first panel having a blind pin-receiving opening, and the second panel having a blind bore in an undersurface portion at the panel end;

a pin having a shank portion, a reduced-diameter portion extending from one end of the shank portion, and an enlarged locking head extending from the reduced-diameter portion;

a hollow sleeve secured to the first panel in the pin-receiving opening, the pin being disposed in the sleeve to be movable between a retracted position in which the pin does not project beyond the surface of the first panel, and an extended position in which the locking head and at least part of the reduced-diameter portion protrude from the surface of the first panel, the sleeve including a retaining means for captively retaining the shank portion of the pin within the sleeve and pin-receiving opening; and a wedge-lock ring seated in the bore of the second panel, the ring having a slot opening into the second panel end to receive the reduced-diameter portion of the pin, the ring having a sidewall with an inwardly sloping portion adjacent the slot to make a wedging fit against the locking head of the pin to draw together and fasten the panels.

* * * * *

UNITED STATES PATENT AND TRADEMARK OFFICE
CERTIFICATE OF CORRECTION

PATENT NO. : 4,146,342
DATED : March 27, 1979
INVENTOR(S) : Gunnar Cederholm

It is certified that error appears in the above-identified patent and that said Letters Patent are hereby corrected as shown below:

In the first sheet of drawings displaying Figures 1-5, change the heading from "Sheet 1 of 2" to -- Sheet 1 of 3 --.

In the second sheet of drawings displaying Figures 6-9, change the heading from "Sheet 2 of 2" to -- Sheet 2 of 3 --.

Insert the attached third sheet of drawings displaying Figures 10-14.

Signed and Sealed this

Thirty-first Day of July 1979

[SEAL]

Attest:

Attesting Officer

LUTRELLE F. PARKER
*Acting Commissioner of Patents and Trademarks*